(12) United States Patent
Vrame

(10) Patent No.: US 6,479,749 B1
(45) Date of Patent: Nov. 12, 2002

(54) PROTECTIVE COVER HAVING TOOL RECESS OR TOOL RECESSES, FOR USE WITH ELECTRICAL BOX HAVING PLASTER RING

(75) Inventor: Peter A. Vrame, Barrington Hills, IL (US)

(73) Assignee: 3244 Corporation, Chicago, IL (US)

( * ) Notice: Subject to any disclaimer, the term of this patent is extended or adjusted under 35 U.S.C. 154(b) by 0 days.

(21) Appl. No.: 09/948,008

(22) Filed: Sep. 6, 2001

Related U.S. Application Data

(63) Continuation-in-part of application No. 09/934,200, filed on Aug. 21, 2001.

(51) Int. Cl.[7] .................................................. H02G 3/14
(52) U.S. Cl. .............................. 174/67; 174/66; 174/58; 220/241; 220/242; 33/528
(58) Field of Search .............................. 174/58, 66, 67, 174/48, 50, 53; 220/241, 242, 3.8, 4.02, 3.2, 3.3, DIG. 10; 439/535; 33/528

(56) References Cited

U.S. PATENT DOCUMENTS

| 4,250,349 | A | * | 2/1981 | Bennett | 220/242 X |
| 4,302,624 | A | * | 11/1981 | Newman | 174/67 |
| 5,243,135 | A | * | 9/1993 | Shotey | 174/67 |
| 5,455,388 | A | * | 10/1995 | Pratt | 220/242 X |
| 6,166,329 | A | * | 12/2000 | Oliver et al. | 174/67 X |
| 6,198,046 | B1 | * | 3/2001 | Moodie | 174/67 |

* cited by examiner

Primary Examiner—Anthony Dinkins
Assistant Examiner—Dhiru R Patel
(74) Attorney, Agent, or Firm—Wood, Phillips, Katz, Clark & Mortimer

(57) ABSTRACT

For an electrical box having a plaster ring, which has a projecting portion defining a generally rectangular aperture, a protective cover having a front panel and flanges is mountable so as at least substantially to cover the generally rectangular aperture. A top flange has two lateral portions, each spaced by a slit from an upper edge of a lateral flange. A bottom flange has two lateral portions, each spaced by a slit from a lower edge of a lateral flange. Each lateral flange has an outer surface that is planar except for a recess adapted to receive a tool inserted between such lateral flange and an adjacent edge of the generally rectangular aperture.

8 Claims, 2 Drawing Sheets

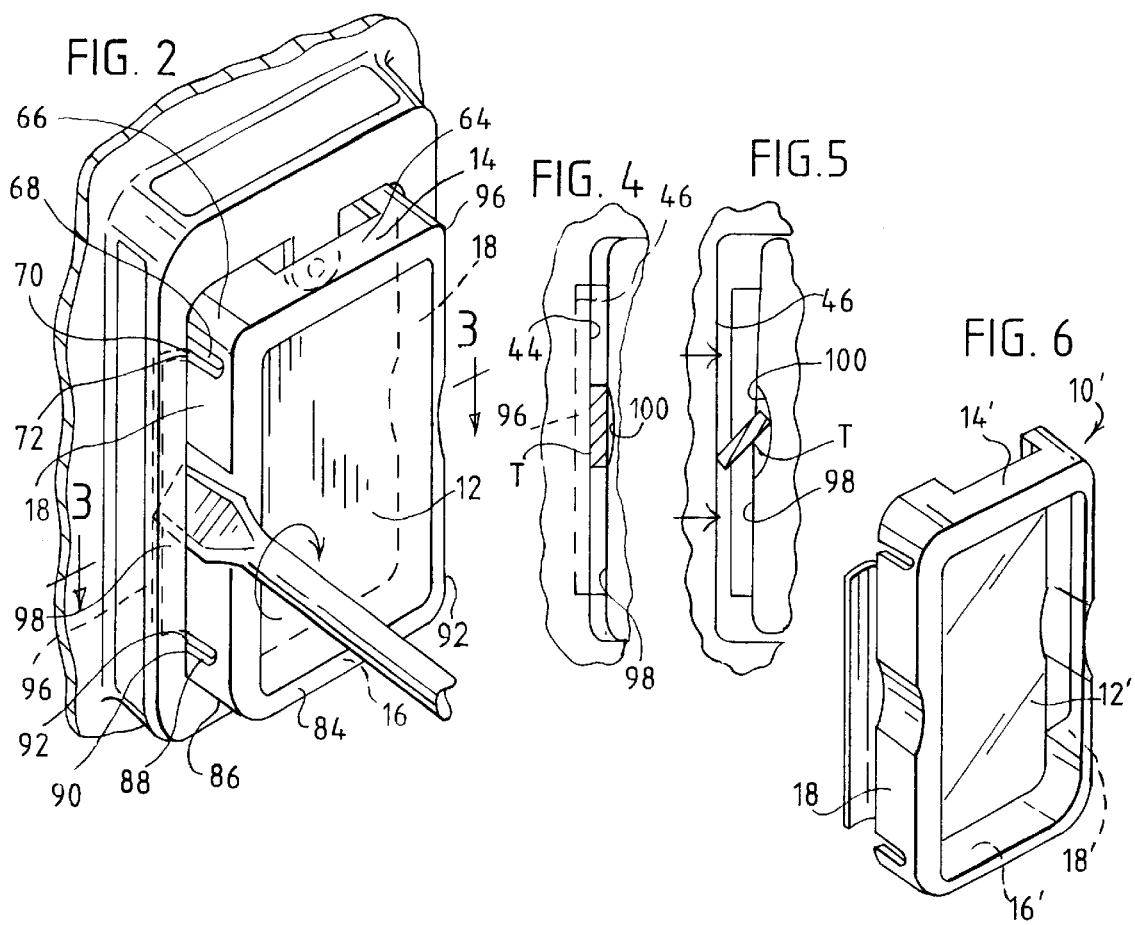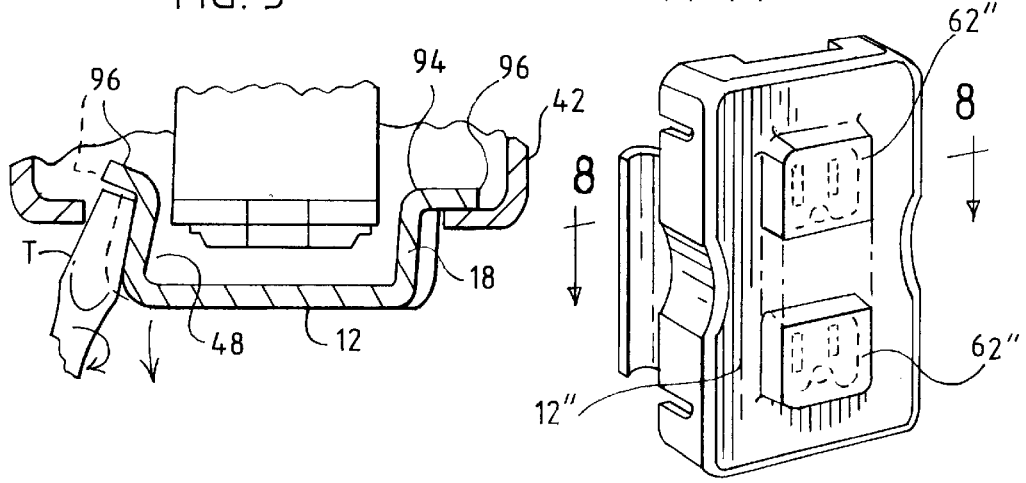

PROTECTIVE COVER HAVING TOOL RECESS OR TOOL RECESSES, FOR USE WITH ELECTRICAL BOX HAVING PLASTER RING

CROSS-REFERENCE TO RELATED APPLICATION

This application is a continuation-in-part of a patent application filed by Paul A. Vrame and Peter A. Vrame on Aug. 21, 2001, for PROTECTIVE COVER ENABLING VIEW OF ELECTRICAL DEVICE IN ELECTRICAL BOX HAVING PLASTER RING, to which application Ser. No. 09/934,200 has been assigned and the disclosure of which application is incorporated herein by reference.

FIELD OF THE INVENTION

This invention pertains to a protective cover for an electrical box having an open front, mounting an electrical device, such as an electrical switch or an electrical outlet, and having a plaster ring having a generally rectangular aperture. This invention provides a recess or recesses to accommodate a tool to facilitate removal of the protective cover.

BACKGROUND OF THE INVENTION

As exemplified in U.S. Pat. Nos. 5,012,043 and 6,166,329, it has been known heretofore to employ a protective cover, which is made of steel, for an electrical box having an open front, mounting an electrical device, such as an electrical switch or an electrical outlet, and having a plaster ring, which fastens to the electrical box, around the open front of the electrical box, and which has a projecting portion defining a generally rectangular aperture providing access to the electrical device, through the open front of the electrical box, after the electrical box, the electrical device, and the plaster ring have been installed behind a wall panel, such as a drywall panel.

As known heretofore, the protective cover is mountable removably to the plaster ring so as substantially to cover the generally rectangular aperture of the plaster ring, whereby to protect the electrical device against foreign matter, such as dust and debris, and against damage, such as damage from a router bit or from a saw blade, while an aperture accommodating the projecting portion of the plaster ring is cut into the wall panel, or against foreign matter, such as paint, wallpaper adhesive, or drywall-finishing material, i.e., so-called "mud", while the wall panel is being decorated near the aperture accommodating the projecting portion of the plaster ring. If the protective cover were not utilized and if the router or the saw blade were to slip, the electrical device could be badly damaged.

At least as early as 1997, a protective cover was available commercially from Ideal Products, Inc. of Wichita, Kans., which cover had lateral formations adapted to coact with lateral edges of the generally rectangular aperture of the projecting portion of a plaster ring, whereby to mount the cover removably to the plaster ring so as substantially to cover the generally rectangular aperture of the plaster ring.

Although the protective covers known heretofore may function well to protect an electrical device against foreign matter, damage, or both, as discussed above, the protective covers can be somewhat difficult to remove, when mounted to the plaster rings, as no provision has is made to accommodate tools to facilitate removal of the protective covers.

SUMMARY OF THE INVENTION

This invention improves a protective cover having a front panel,,a top flange, a bottom flange, and two lateral flanges, for use with an electrical box having a plaster ring, as explained above. This invention provides a recess or recesses to accommodate a tool to facilitate removal of the protective cover.

The protective cover has a front panel, a top flange, a bottom flange, and two lateral flanges. Each lateral flange is spaced from the upper flange by a slit at an upper edge of said lateral flange. Each lateral flange is spaced from the bottom flange by a slit at a lower edge of said lateral flange. The slits permit the lateral flanges to flex.

Preferably, the front panel meets each of the lateral flanges at a curved edge, which meets each of the lateral portions of the top and bottom flanges at a rounded comer. Preferably, the curved edges and the lateral portions of the top and bottom flanges are curved similarly. Preferably, each of the curved edges and each of the lateral portions of the top and bottom flanges are curved so as to have an exterior radius of approximately 0.25 inch.

Each lateral flange has an elongate tab, which fits behind an adjacent edge of the generally rectangular aperture of the projecting portion of the plaster ring when the protective cover is mounted to the plaster ring, in a manner known from the protective cover that was available commercially from Ideal Products, Inc. of Wichita, Kans., as discussed above.

As the protective cover is improved by this invention, at least one of the lateral flanges has an outer surface that is planar except for a recess, which is adapted to receive a tool inserted between the same one of the lateral flanges and an adjacent edge of the generally rectangular aperture of the projecting portion of the plaster ring, when the protective cover is mounted to the plaster ring, so as to enable the tool to be then twisted so as to flex the same one of the lateral flanges inwardly.

Preferably, each lateral flange has an outer surface that is planar except for a recess, which is adapted to receive a tool inserted between said lateral flange and an adjacent edge of the generally rectangular aperture of the projecting portion of the plaster ring, when the protective cover is mounted to the plaster ring, so as to enable the tool to be then twisted so as to flex said lateral flange inwardly.

BRIEF DESCRIPTION OF THE DRAWINGS

FIG. 2, on a larger scale compared to FIG. 1, is a fragmentary, perspective, assembled view of the protective cover and the plaster ring, as shown in FIG. 1, along with a tool inserted into a recess, which is provided by this invention, to facilitate removal of the protective cover.

FIG. 3, on a similar scale, is a fragmentary cross-section taken along line 3—3 in FIG. 2, in a direction indicated by arrows and showing how a lateral flange of the protective cover can flex when the tool is twisted.

FIGS. 4 and 5, on a similar scale, are fragmentary details showing progressively how the lateral flange of the protective cover can flex when the tool is twisted.

FIG. 6, on a similar scale, is a perspective view of a protective cover of an alternative construction embodying this invention.

FIG. 7, on a smaller scale compared to FIGS. 2 through 6, is a perspective view of a protective cover of an alternative construction embodying this invention.

FIG. 8, on a similar scale, is a fragmentary cross-section taken along line 8—8 in FIG. 7, in a direction indicated by arrows, exemplary dimensions being given.

DETAILED DESCRIPTION OF THE ILLUSTRATED EMBODIMENTS

Figure 1:
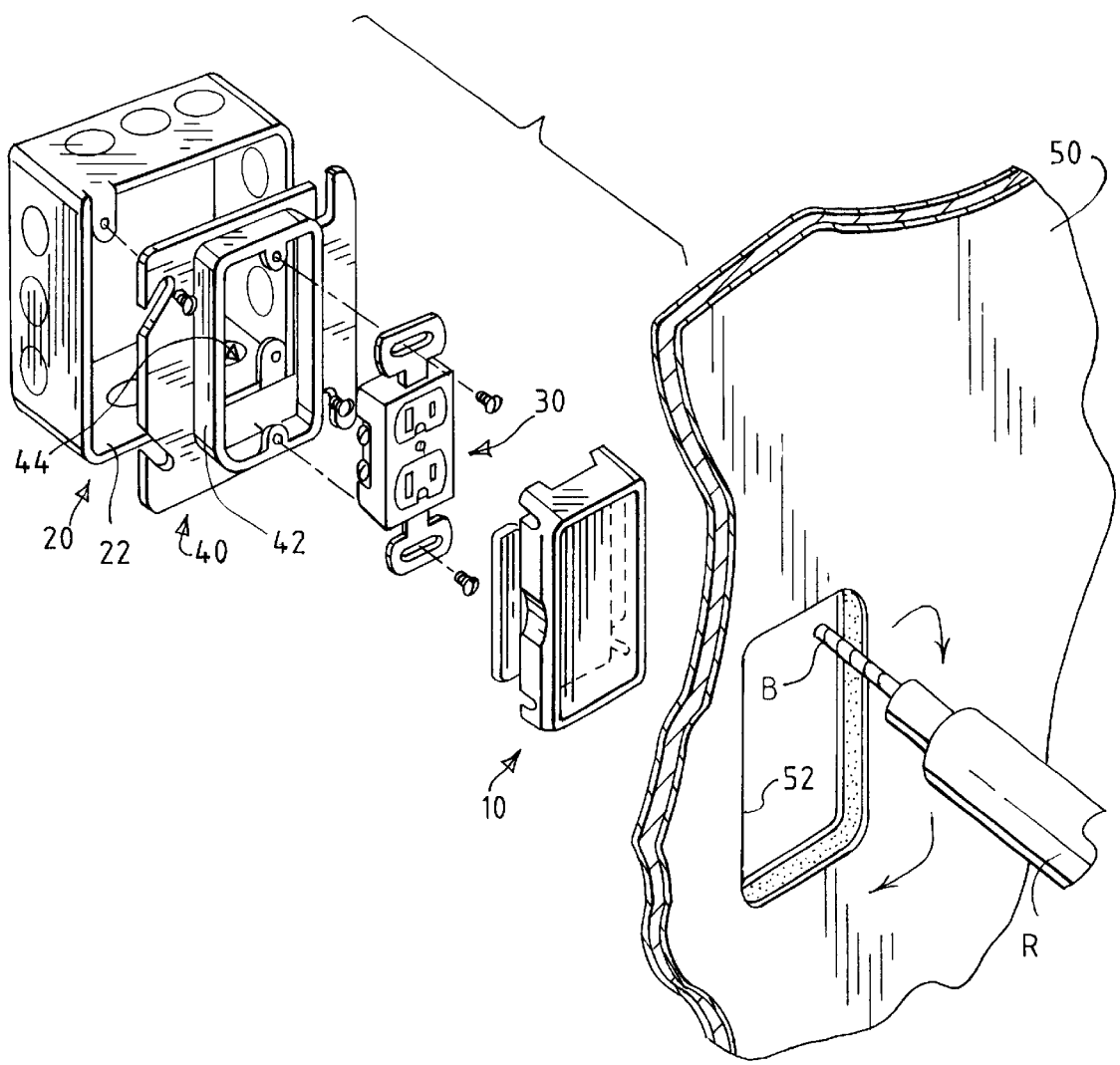
FIG. 1 is a fragmentary, perspective, exploded view of a protective cover of one contemplated construction embodying this invention, as utilized with an electrical box mounting an electrical outlet and having a plaster ring having a projecting portion, so as to protect the electrical outlet against foreign matter, damage, or both while an aperture accommodating the projecting portion of the plaster ring is cut into a wall panel, via a router.

As shown in FIG. 1, a protective cover 10 stamped from a sheet of galvanized or stainless steel so as to be box-like and so as to have a front panel 12, a top flange 14, a bottom flange 16, and two lateral flanges 18 is provided for an electrical box 20 made of galvanized or stainless steel, having an open front 22, mounting an electrical outlet 30, and having a plaster ring 40, which is made of galvanized or stainless steel, which fastens to the electrical box 20 via fasteners (not shown) in a known manner, around the open front 22 of the electrical box 20, and which has a projecting portion 42 defining a generally rectangular aperture 44 providing access to the electrical outlet 30, through the open front 22 of the electrical box 30, after the electrical box 20, the electrical outlet 30, and the plaster ring 40 have been installed behind a wall panel 50, such as a drywall panel.

As shown in FIG. 1, it is common to utilize a router R having a rotary bit B to cut an aperture 52 accommodating the projecting portion 42 of the plaster ring 40 into the wall panel 50 after the electrical box 20, the electrical outlet 30, and the plaster ring 40 have been installed behind the wall panel 50. The protective cover 10 is utilized to protect the electrical outlet 30 against foreign matter, such as dust and debris, and against damage, as such as damage from a router bit,while the aperture 52 is cut into the wall panel 50. The protective cover 10 can be then utilized to protect the electrical outlet 30 against foreign matter, such as paint, wallpaper adhesive, or drywall-finishing material, while the wall panel 50 is being decorated near the aperture 52. After the wall panel 50 has been decorated near the aperture 52, the protective cover 10 can be then removed so as to permit a decorative plate (not shown) to be then installed in a known manner.

The top flange 14 has a flat, central portion 64 and two lateral portions 66, one said portion 66 being shown and the other portion being a mirror image of the said portion 66 that is shown. Each lateral portion 66 curves downwardly to a lower edge 68, which is spaced by a slit 70 from an upper edge 72 of one of the lateral flanges 18. The bottom flange has a flat, central portion 84 and two lateral portions 86, one said portion 86 being shown and the other portion 86 being a mirror image of the said portion 86 that is shown. Each lateral portion 84 curves upwardly to an upper edge 88, which is spaced by a slit 90 from a lower edge 92 of one of the lateral flanges 18. The slits 70, 90, permit the lateral flanges 18 to flex, as shown in FIG. 3.

Preferably, the front panel 12 meets each of the lateral flanges 18 at a curved edge 94, which meets each of the lateral portions 66, 86, of the top and bottom flanges 14, 16, at a rounded corner 96. Preferably, the curved edges 94 and the lateral portions 66, 86, of the top and bottom flanges 14, 16, are curved similarly. Preferably, each of the curved edges 94 and each of the lateral portions 66, 86, of the top and bottom flanges 14, 16, are curved so as to have an exterior radius of approximately 0.25 inch.

Because the slits 70, 90, permit the lateral flanges 18 to flex, each of the lateral flanges 18 can have a vertically elongate tab 96, which is adapted to coact with a lateral margin 46 of the generally rectangular aperture 44 of the projecting portion 42 of the plaster ring 40, when the lateral flanges 18 are flexed inwardly, so as to mount the protective cover 10 removably to the projecting portion 42 of the plaster ring 40 in a manner known from the protective cover that was available commercially from Ideal Products, Inc. of Wichita, Kans., as discussed above.

Optionally, the front panel 12 of the protective cover 10 may have a window, which may have a transparent sight, or plural such windows, as disclosed in the aforementioned application, of which this application is a continuation-in-part. In an alternative embodiment of this invention, the protective cover 10 has substantially square edges defining substantially square corners with slits between the top and bottom flanges 14, 16, and the lateral flanges 18, as disclosed in the aforementioned application, of which this application is a continuation-in-part.

In a preferred embodiment of this invention, each lateral flange 18 has an outer surface 98 that is planar except that said lateral flange 18 is formed with a recess 100, which is adapted to receive a tool T, such as a blade of a screwdriver, when the tool T is inserted between said lateral flange 18 and an adjacent edge 46 of the generally rectangular aperture 44, of the projecting portion 42 of the plaster ring 40, when the protective cover 10 is mounted to the plaster ring 40, so as to enable the tool T to be then twisted so as to flex said lateral flange 18 inwardly. In a simplified embodiment of this invention, one lateral flange 18 is formed with such a recess 100, whereas the other flange 18 is not formed with such a recess 100.

As shown in FIGS. 2 through 5, if the tool T has a sufficient width, the tool T can be thus twisted sufficiently for the vertically elongate tab 96 of the lateral flange 98 having the recess 100 receiving the tool T to clear the adjacent edge 46 of the generally rectangular aperture 44 of the projecting portion 42 of the plaster ring 40, so as to enable the protective cover 10 to be then removed from the plaster ring 40.

As shown in FIG. 4, a protective cover 10' having a front panel 12', a top flange 14', a bottom flange 16', and two lateral flanges 18' is similar to the protective cover 10 and is utilized similarly, except that the protective cover 10' in its entirety is made from a transparent, polymeric material, such as polycarbonate, as by injection molding or by thermoforming.

As shown in FIGS. 1 through 5, the protective cover 10 is shallow and the front panel 12 is flat, within the curved edges of the front panel 12. As shown in FIG. 6, the protective cover 10' is shallow and the front panel 12' is flat, within the curved edges of the front panel 12.' Thus, each of the protective covers 10, 10', is useful with an electrical outlet, such as the electrical outlet 30.

As shown in FIG. 7 and in FIG. 8, in which exemplary dimensions are given, the front panel 12" of a protective cover 10", which otherwise is similar to the protective cover 10, has two spaced projections 62" (or, as shown in dashed lines, one elongate, centered projection) to accommodate the toggles (not shown) of a adjoining pair of electrical switches. In an alternative embodiment, the front panel 12" can have one centered projection 62" to accommodate the toggle (not shown) of an electrical switch. Rather than being stamped from steel, the protective cover 10" can be alternatively made from a transparent, polymeric material, such as polycarbonate, as by injection molding or by thermoforming.

What is claimed is:

1. For an electrical box having an open front, mounting an electrical device, and having a plaster ring, which fastens to the electrical box, around the open front of the electrical box, and which has a projecting portion defining a generally rectangular aperture providing access to the electrical device, through the open front of the electrical box, after the electrical box, the electrical device, and the plaster ring have been installed behind a flange panel, a protective cover mountable removably to the plaster ring so as at least substantially to cover the generally rectangular aperture of the plaster ring, whereby to protect the electrical device against foreign matter, damage, or both while an aperture accommodating the projecting portion of the plaster ring is cut into the flange panel or while the flange panel is being decorated near the aperture accommodating the projecting portion of the plaster ring, the protective cover having a front panel, a top flange, a bottom flange, and two lateral flanges, wherein each lateral flange is spaced from the top flange by a slit at an upper edge of said lateral flange and is spaced from the bottom flange by a slit at a lower edge of said lateral flange, which slits permit the lateral flanges to flex, wherein each lateral flange has an elongate tab, which fits behind an adjacent edge of the generally rectangular aperture of the projecting portion of the plaster ring when the protective cover is mounted to the plaster ring, and wherein each lateral flange has an outer surface that is planar except for a recess, which is adapted to receive a tool inserted between said lateral flange and an adjacent edge of the generally rectangular aperture of the projecting portion of the plaster ring, when the protective cover is mounted to the plaster ring, so as to enable the tool to be then twisted so as to flex said lateral flange inwardly.

2. The protective cover of claim 1 wherein the top flange has a flat, central portion and two first lateral portions, each first lateral portion extending downwardly to a lower edge, which is spaced from an adjacent one of the lateral flanges by the slit at the upper edge of the adjacent one of the lateral flanges, and the bottom flange has a flat, central portion and two second lateral portions, each second lateral portion extending upwardly to a lower edge, which is spaced from an adjacent one of the lateral flanges by the slit at the lower edge of the adjacent one of the lateral flanges.

3. The protective cover of claim 1 wherein the top flange has a flat, central portion and two first lateral portions, each first lateral portion curving downwardly to a lower edge, which is spaced from an adjacent one of the lateral flanges by the slit at the upper edge of the adjacent one of the lateral flanges, and the bottom flange has a flat, central portion and two second lateral portions, each second lateral portion curving upwardly to a lower edge, which is spaced from an adjacent one of the lateral flanges by the slit at the lower edge of the adjacent one of the lateral flanges.

4. The protective cover of claim 3 wherein each of the lateral portions of the top and bottom flanges is curved so as to have an exterior radius of approximately 0.25 inch.

5. For an electrical box having an open front, mounting an electrical device, and having a plaster ring, which fastens to the electrical box, around the open front of the electrical box, and which has a projecting portion defining a generally rectangular aperture providing access to the electrical device, through the open front of the electrical box, after the electrical box, the electrical device, and the plaster ring have been installed behind a flange panel, a protective cover mountable removably to the plaster ring so as at least substantially to cover the generally rectangular aperture of the plaster ring, whereby to protect the electrical device against foreign matter, damage, or both while an aperture accommodating the projecting portion of the plaster ring is cut into the flange panel or while the flange panel is being decorated near the aperture accommodating the projecting portion of the plaster ring, the protective cover having a front panel, a top flange, a bottom flange, and two lateral flanges, wherein each lateral flange is spaced from the top flange by a slit at an upper edge of said lateral flange and is spaced from the bottom flange by a slit at a lower edge of said lateral flange, which slits permit the lateral flanges to flex, wherein each lateral flange has an elongate tab, which fits behind an adjacent edge of the generally rectangular aperture of the projecting portion of the plaster ring when the protective cover is mounted to the plaster ring, and wherein at least one of the lateral flanges has a outer surface that is planar except for a recess, which is adapted to receive a tool inserted between the same one of the lateral flanges and an adjacent edge of the generally rectangular aperture of the projecting portion of the plaster ring, when the protective cover is mounted to the plaster ring, so as to enable the tool to be then twisted so as to flex the same one of the lateral flanges inwardly.

6. The protective cover of claim 5 wherein the top flange has a flat, central portion and two first lateral portions, each first lateral portion extending downwardly to a lower edge, which is spaced from an adjacent one of the lateral flanges by the slit at the upper edge of the adjacent one of the lateral flanges, and the bottom flange has a flat, central portion and two second lateral portions, each second lateral portion extending upwardly to a lower edge, which is spaced from an adjacent one of the lateral flanges by the slit at the lower edge of the adjacent one of the lateral flanges.

7. The protective cover of claim 5 wherein the top flange has a flat, central portion and two first lateral portions, each first lateral portion curving downwardly to a lower edge, which is spaced from an adjacent one of the lateral flanges by the slit at the upper edge of the adjacent one of the lateral flanges, and the bottom flange has a flat, central portion and two second lateral portions, each second lateral portion curving upwardly to a lower edge, which is spaced from an adjacent one of the lateral flanges by the slit at the lower edge of the adjacent one of the lateral flanges.

8. The protective cover of claim 7 wherein each of the lateral portions of the top and bottom flanges is curved so as to have an exterior radius of approximately 0.25 inch.

* * * * *